May 26, 1970   TAKAAKI KUROKAWA ET AL   3,514,277
GLASS BULB KNOCKOUT DEVICE OF A RIBBON MACHINE
Filed May 19, 1967

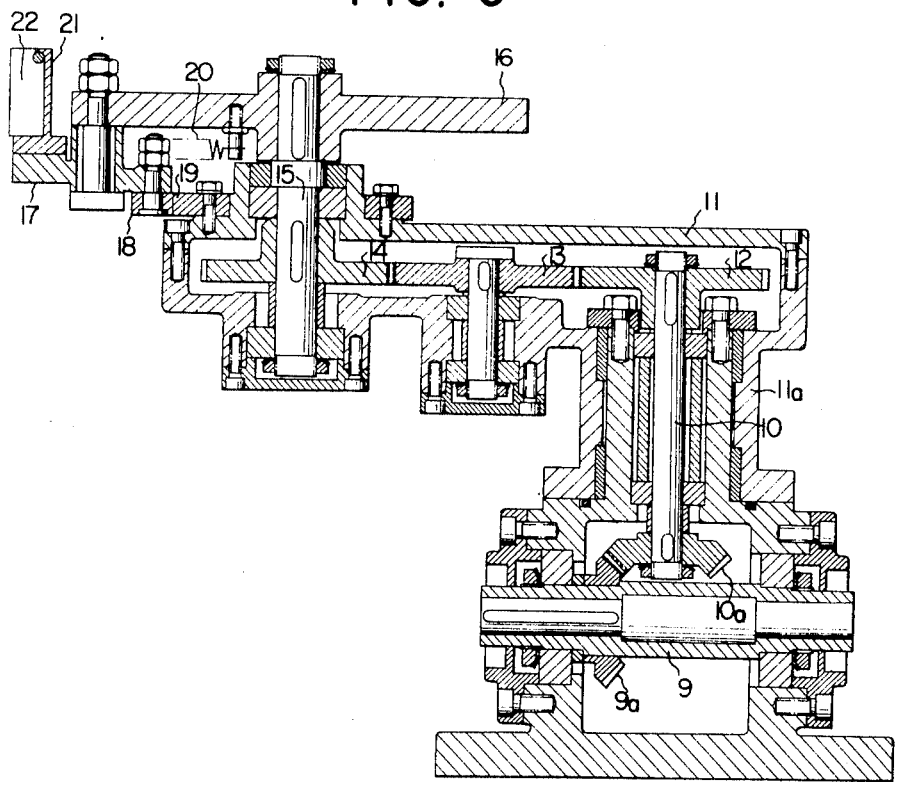

United States Patent Office 3,514,277
Patented May 26, 1970

1

3,514,277
GLASS BULB KNOCKOUT DEVICE OF
A RIBBON MACHINE
Takaaki Kurokawa, Chigasaki-shi, and Noboru Inoue,
Funabashi-shi, Japan, assignors to Tokyo Shibaura
Denki Kabushiki Kaisha, Kawasaki-shi, Kanagawa-ken,
Japan, a joint-stock company of Japan
Filed May 19, 1967, Ser. No. 639,898
Claims priority, application Japan, Sept. 30, 1966,
41/64,504
Int. Cl. C03b 9/12, 33/00
U.S. Cl. 65—181
8 Claims

ABSTRACT OF THE DISCLOSURE

A knockout device for knocking out glass bulbs formed by a ribbon type glass blowing machine is provided with a rotating disc to carry a plurality of pivoted arms each including a hammerhead and with a cam adapted to rotate each arm in a direction perpendicular to the pass line of the bulbs. Means are also provided to bodily move said disc and cam toward and away from the pass line to adjust the overlap between the hammerhead and bulbs.

---

This invention relates to improvements relating to a glass bulb knockout device or machine for use in a glass bulb blowing machine, more particularly a so-called ribbon machine wherein a flow of molten glass supplied from an orifice at the bottom of a glass melting furnace is pressed into a ribbon shaped glass blank and a plurality of glass bulbs are successively blown and moulded while the blank is conveyed along a predetermined line.

A prior art knockout device adapted to engage and knockout glass bulbs comprises a stationary knocker positioned at an angle with respect to the direction of movement of the glass ribbon. As a result, successive glass bulbs which are caused to impinge upon the knocker at a high speed and are thereby ejected in the direction of the reflection angle. The impulsive force applied to bulbs increases with the running speed of the ribbon machine so that the tendency to damage or crack formed glass bulbs increases with the speed of production. Further, the distance of ejection of knocked out bulbs is determined by the production speed, and, at a certain speed, bulbs successively ejected may interfere with each other, thus causing damage.

It is, therefore, an object of this invention to provide a novel knockout device which does not impart large impulsive force to bulbs during high speed operation of the glass bulb blowing machine.

A further object of this invention is to provide an improved knockout device capable of adjusting the distance of ejection of bulbs independently of the running speed of the blowing machine.

A still further object of this invention is to provide a novel knockout device in which interference between ejected bulbs is eliminated.

In accordance with the invention there is provided a knockout device for a ribbon type glass bulb blowing machine comprising a plurality of hammers, means for moving the hammers in substantially the same direction and at substantially the same speed as the bulbs in order to position the hammers in juxtaposition to respective bulbs and means for successively actuating the hammers while thus positioned to move the hammers in a direction substantially pependicular to the direction of movement of the bulbs so as to engage and successively knock out the bulbs.

FIG. 3 shows a cross-sectional view, taken along the line III—III, of the embodiment shown in FIG. 2.

Figure 1:
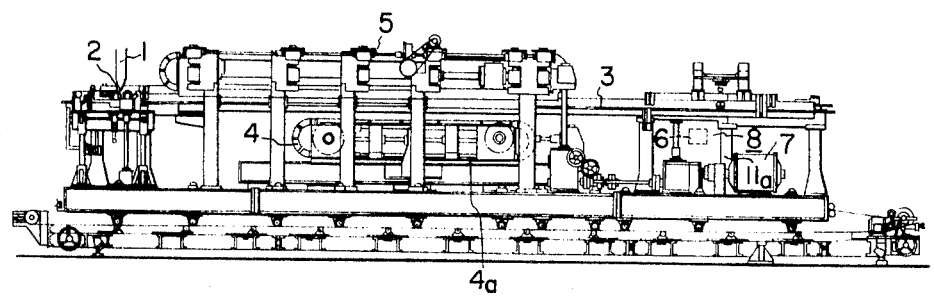
FIG. 1 shows a side elevation of a ribbon machine in which the glass bulb knockout device of this invention may be used.

FIG. 1 of the accompanying drawing shows a side view of a typical ribbon machine. In this machine a flow of molten glass 1 supplied from a glass melting furnace, not shown, is pressed into a ribbon shaped bank by passing the glass through a pair of feed rollers 2 at the entrance end of the machine. The glass ribbon is then placed upon an endless plate conveyor, not shown, moving horizontally along a guide 3 to be fed toward the right-hand side as viewed in the drawing.

During this movement, each of the parisons depending from openings of respective plates of the plate conveyor is surrounded by a mould carried by each link of a mould supporting conveyor 4 which is arranged to move along a guide 4a. Also during this movement a blow-head carried by each link of a blow-head supporting conveyor travelling along a guide 5 is brought to cooperate with the upper opening of the parison to effect blowing of glass bulbs. After said blow-head and mould have disengaged from the blown bulb formed beneath the glass ribbon, the bulb is knocked out by a knockout mechanism 6.

Conventional knockout mechanism utilized in this type of machine comprises a stationary knocker alone, and the knocking out and discharge operations of bulbs formed beneath the glass ribbon are effected in the following manner.

As the ribbon is advanced, formed bulbs are successively advanced to the knockout mechanism at a high speed and then knocked out thereby. However, as the knocker of the knockout mechanism is installed at an angle with respect to the direction of advance of the ribbon, bulbs removed from the ribbon in the manner described above are discharged out of the machine in the direction of the reflection angles. Thus, for example, when the surface of the knocker is at an angle of 45° with respect to the direction of advance of the ribbon, bulbs are discharged at an angle of 90°.

With such a knockout mechanism, impulsive collision of bulbs against the knocker often results in damage and rupture of the bulbs. Further, said impulsive force increases with the running speed of the machine or the production speed of bulbs, thus increasing the number of rejects. However, such increase in the impulsive force caused by the increase in the production speed is inevitable in modern ribbon machines.

Moreover, as the bulbs are knocked out and then ejected in the manner described above, the distance of ejection is determined by the speed of ribbon or the production speed of bulbs, so that it is impossible to design the projection distance independently of said speeds. Consequently, at a certain speed bulbs which are successively knocked out and ejected may interfere with each other near the exit port, thus causing damage.

As already pointed out, this invention contemplates providing a novel knockout mechanism which can eliminate these difficulties.

The knockout mechanism embodying this invention and adapted to be installed at 6 in the ribbon machine shown in FIG. 1 is driven by an electric motor 7 through a transmission mechanism 8.

Figure 2:
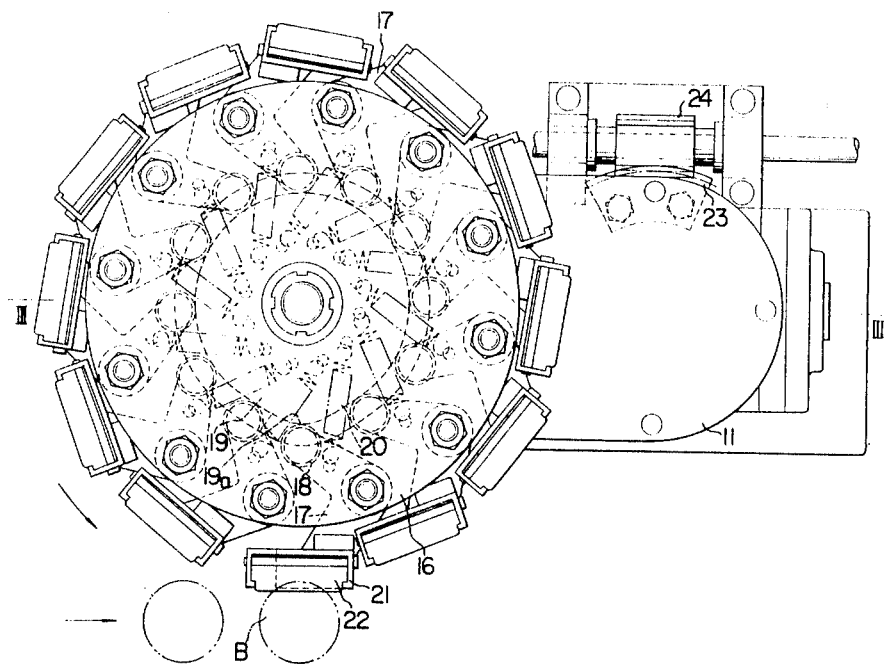
FIG. 2 shows a top plan view of one embodiment of this invention.

More particularly, as shown in FIGS. 2 and 3, a horizontal shaft 9 driven by a synchronism adjuster, not shown, installed in the transmission mechanism 8 operates to drive a vertical shaft 10 through bevel gears 9a and 10a. The shaft 10 is contained in a cylindrical portion 11a of a gear box 11 to rotate a hammer driving shaft 15 through gears 12, 13 and 14.

A circular disc 16 is secured on the upper end of the hammer driving shaft 15, and a plurality of equally spaced L shaped levers 17 are pivoted at their bends near the periphery of disc 16. On the inner end of each L shaped lever, there is mounted a roller 18 urged against the periphery of a stationary cam 19 coaxial with disc 16 by means of a spring 20 connected between a pin on the lower surface of the disc 16 and the lever 17. An arm 21 is secured to the outer end of each lever to hold a hammer head 22 made of a heat resist resilient material such as carbon or the like.

A sector wheel 23 comprising a portion of a worm wheel concentric with shaft 10 is secured on the periphery of gear box 11, said sector gear meshing with a worm wheel 24 parallel with horizontal shaft 9. It is to be understood that the stationary cam 19 is so disposed that the radius passing through its high point 19a intersects the pass line of the glass ribbon at 90°.

The operation of the knockout device is as follows.

Shaft 15 and disc 16 are rotated in synchronism with the speed of ribbon and, hence, the glass bulbs B formed thereon, and each hammer head 22 is so arranged that it will engage a bulb B when it passes through a line interconnecting the axis of the cam and the high point thereof. Consequently, when roller 18 on the inner end of lever 17 engages the high point 19a, the lever is rotated in the counterclockwise direction to bring the outer arm thereof in substantially the radial direction of the cam to eject bulb B in a direction substantially perpendicular to the direction of movement thereof. Thus, the direction of ejection of bulbs B is not determined by the reflection angle as in the conventional stationary knocker but, instead, is determined by the resultant of the movements of hammer heads and bulbs.

Further, rotation of gear box 11 about shaft 10 caused by worm 24 results in the displacement of rotating disc 16 in a direction normal to the pass line of bulbs B, whereby the overlap between hammer head 22 and bulb B is adjusted. This adjustment of the overlap permits adjustment of the impulsive force acting upon the bulbs, thus adjusting the distance of ejection of bulbs.

Thus, it will be clear that, with the knockout device embodying this invention, since it is possible to adjust the impulsive force for bulbs as well as the distance of ejection independently of the production speed of the bulbs, all of the difficulties above pointed out of the conventional stationary knockout device can be eliminated.

What we claim is:

1. A knockout device of a ribbon type glass bulb blowing machine comprising a circular disc, means to rotate said disc, a stationary cam including a high point and disposed coaxially with said disc, a plurality of equally spaced levers pivoted on the periphery of said disc, a hammer head mounted on the outer end of each of said levers, a roller mounted on the inner end of each of said levers, and means to urge said roller against said cam, said cam being so positioned that the radial line thereof passing through said high point intersects substantially at right angles the pass line of glass bulbs blown on a ribbon-shaped glass blank thereby to knock down and eject said bulbs.

2. The knockout device according to claim 1 wherein a gear box containing a gear mechanism for driving said circular disc is provided with means to displace said disc in a direction perpendicular to the direction of movement of said bulbs.

3. A knockout device of a ribbon type glass bulb blowing machine, comprising a plurality of hammers, means for moving said hammers in substantially the same direction and at substantially the same speed as said bulbs to position said hammers in juxtaposition to respective bulbs, and means for successively actuating said hammers while thus positioned to move said hammers in a direction substantially perpendicularly to the direction of movement of said bulbs to engage and successively knock out said bulbs.

4. A knockout device according to claim 3, in which said means for moving said hammers comprises carrier means on which said hammers are mounted and means for driving said carrier means in synchronism with the movement of said bulbs.

5. A knockout device according to claim 4, in which said actuating means comprises a cam follower on each said hammer and stationary cam means engaged by said cam followers to actuate said hammers as said hammers are moved along said cam means by said carrier means.

6. A knockout device according to claim 5, in which each said hammer comprises a two arm lever pivotally mounted on said carrier means and having a hammerhead on one said arm and said cam follower on the other said arm.

7. A knockout device according to claim 6, further comprising spring means for biasing said lever in a direction to bias said cam follower in engagement with said cam means.

8. A knockout device according to claim 4, further comprising means for adjustably moving said carrier means and hammers bodily toward and away from the path of travel of said bulbs to vary and knockout action of said hammers on said bulbs.

References Cited

UNITED STATES PATENTS 2,091,494    8/1937    Snyder _____ 225—103
3,113,013   12/1963    Anderson et al. _____ 65—177

ARTHUR D. KELLOGG, Primary Examiner

U.S. Cl. X.R.

65—185; 225—103